United States Patent
Dunfield

[15] 3,706,923
[45] Dec. 19, 1972

[54] BRUSHLESS D.C. MOTOR ACCELERATION SYSTEM
[72] Inventor: John C. G. Dunfield, Phoeniz, Ariz.
[73] Assignee: Sperry Rand Corporation
[22] Filed: April 28, 1971
[21] Appl. No.: 138,160

[52] U.S. Cl. ................318/254, 318/415, 318/599, 318/661
[51] Int. Cl. ............................................H02k 29/00
[58] Field of Search......318/599, 661, 685, 696, 254, 318/415, 396, 398

[56] References Cited
UNITED STATES PATENTS

| | | | |
|---|---|---|---|
| 3,518,516 | 6/1970 | Pawletko | 318/415 X |
| 3,601,678 | 8/1971 | Abraham | 318/685 |
| 3,309,597 | 3/1967 | Gabor et al. | 318/396 X |
| 3,575,653 | 4/1971 | Gucwa | 318/685 |

Primary Examiner—G. R. Simmons
Attorney—S. C. Yeaton

[57] ABSTRACT

A brushless d.c. motor containing a permanent magnet rotor and wound stator includes a resolver for sensing the rotor angular position. The position sensor is used in conjunction with a pulse width modulator and switching circuit in bringing the motor up to rated speed. An oscillator provides an alternating current of the proper frequency for driving the motor at its desired speed. A frequency phase detector compares the output of the oscillator with the output of the position sensor. Until the motor reaches the desired speed, the switch permits the motor to be driven in a closed loop fashion in response to signals from the position sensor. When the detector senses frequency and phase coincidence, the switch transfers operation of the motor from the sensing means to the oscillator.

6 Claims, 2 Drawing Figures

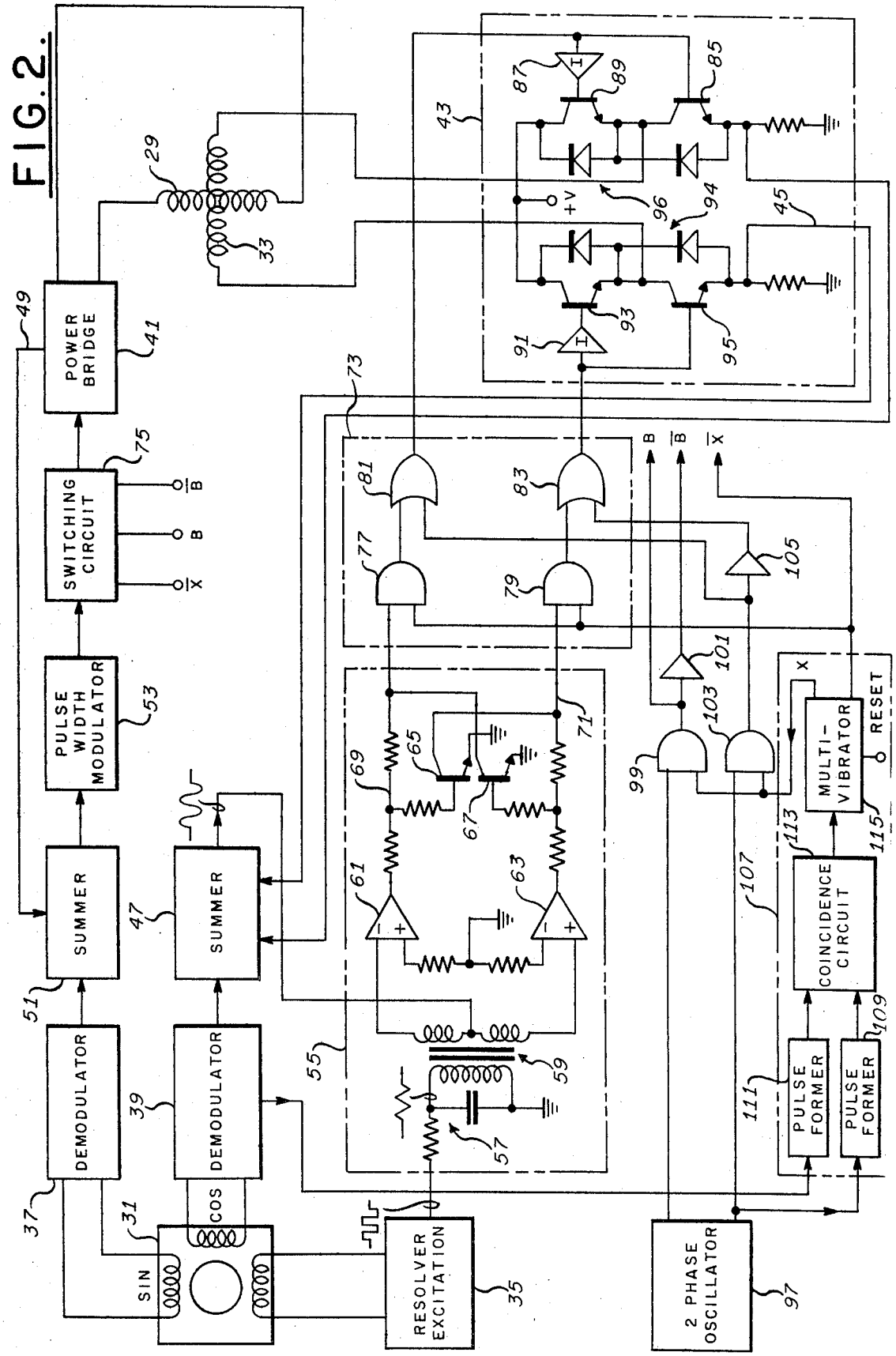

3,706,923

BRUSHLESS D.C. MOTOR ACCELERATION SYSTEM

BACKGROUND OF THE INVENTION

1. Field of the Invention

This invention relates to electric motors and more specifically to brushless d.c. motors capable of operating at a predetermined constant speed.

2. Description of the Prior Art

A wide variety of brushless d.c. motors is known in the art. In general, these devices employ a permanently magnetized rotor and a plurality of stator windings arranged on poles disposed around the periphery of the motor frame. The angular displacement of the rotor is sensed by non-contacting means such as optical means or Hall Effect devices. Current is then switched to appropriate stator windings in response to the output of the switching means so as to cause rotation of the rotor. The speed of such motors, however, is ordinarily influenced by supply voltage changes and load fluctuations. U.S. Pat. No. 3,364,407, issued to R. K. Hill and assigned to the present assignee, concerns a brushless d.c. motor in which the instantaneous rotor displacement is corrected by means of synchronizing pulses after the rotor has reached a specified operating speed. The rotor speed in this device, however, is corrected at selected points during each revolution and is not under the constant control of a precise clock source. Thus, in contrast to the motor of the aforementioned patent, the present invention provides a device which is less susceptible to incremental rotor perturbations.

SUMMARY OF THE INVENTION

The motor of the present invention operates in a closed-loop fashion until a predetermined rotor speed is achieved. When synchronism of frequency and phase between the rotor rotation and an external clock source occurs, the operation of the motor is transferred solely to the control of the clock source.

BRIEF DESCRIPTION OF THE DRAWINGS

FIG. 2 is a schematic diagram illustrating the construction and operation of the invention.

DESCRIPTION OF THE PREFERRED EMBODIMENT

Figure 1:
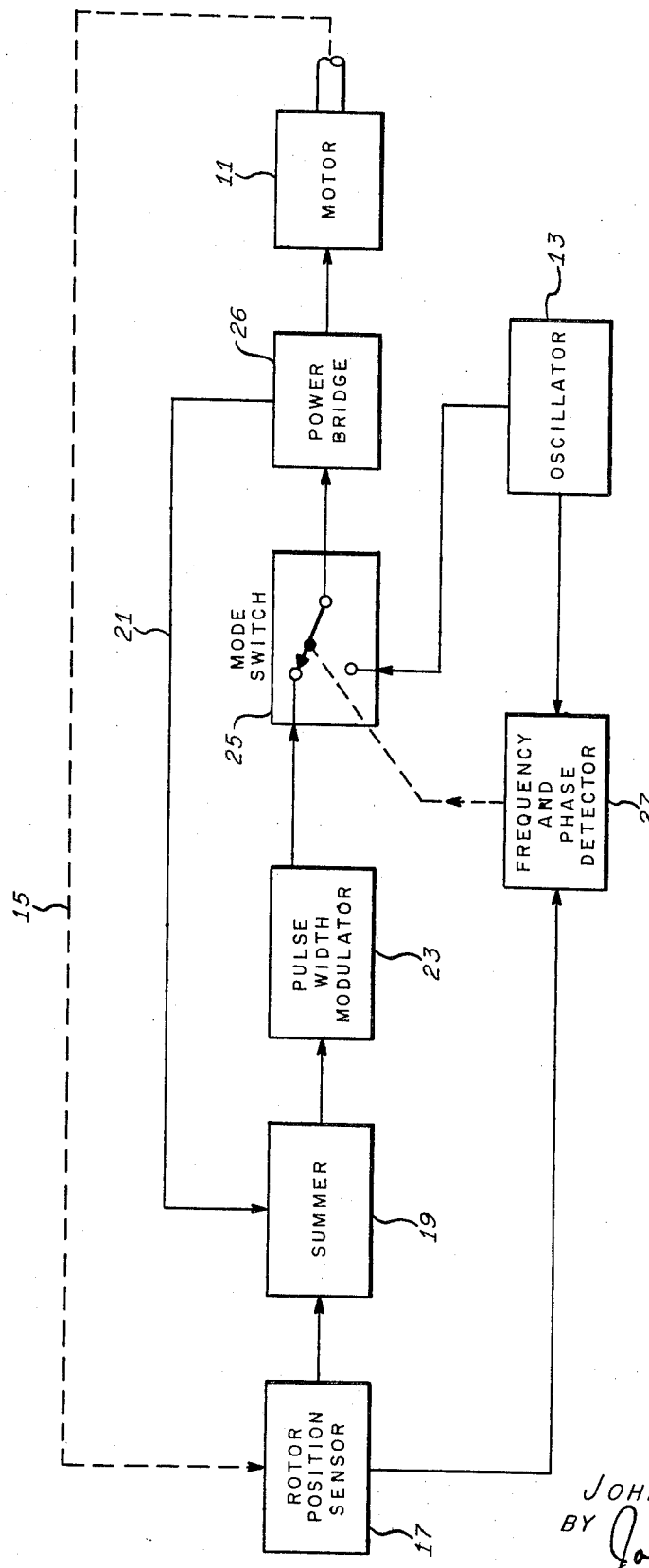
FIG. 1 is a block diagram useful in explaining the invention.

Referring now to FIG. 1, a brushless d.c. motor (BDCM) 11 which is to be operated in synchronism with the output of a sine wave oscillator 13 employs a closed-loop feedback system to bring the motor up to operating speed. The closed-loop feedback system includes a mechanical linkage 15 for operating a rotor position sensor 17. As presently preferred, a four-pole motor is used and the rotor position sensor 17 preferably includes a resolver circuit which provides sine and cosine waves having magnitudes which uniquely define the displacement angle of the rotor at any time. The output of the rotor position sensor is applied to a summer 19. A feedback signal indicative of the instantaneous current flowing in the stator windings of the motor is also applied to the summer 19 through a line 21. The output of the summer is applied to a pulse width modulator 23 which effectively "digitizes" the output of the summer so as to produce a signal which is a combined function of the position of the rotor, the speed of the rotor and the stator winding current. The output of the pulse width modulator is then applied through a mode switch 25 and power bridge 26 to the motor.

A signal from the rotor position sensor and a signal from the oscillator are each applied to a frequency and phase detector 27. The frequency and phase detector compares the outputs of the oscillator 13 and the rotor position sensor 17. When the output of the sensor becomes synchronized with the output of the oscillator, the frequency and phase detector produces a switching signal which throws the mode switch 25 into a position such that the signal from the oscillator 13 now drives the motor and the signal from the pulse width modulator no longer contributes to the operation of the motor.

In summary, the motor operates through the closed-loop feedback circuit during the time that the motor is accelerating to its desired speed. When the motor reaches the desired operating speed, operation continues in an open-loop mode solely under the control of the oscillator 13.

FIG. 2 illustrates a motor employing the principles of the invention in more detail. A first rotor winding 29 is energized in response to signals occurring in a first phase loop driven from the sine output of a resolver 31.

The second stator winding 33, which is disposed in space quadrature with the winding 29, is energized in response to signals flowing in a second phase loop and originating in the cosine output of the resolver 31.

The resolver 31 is a conventional device that is driven from a resolver excitation circuit 35 to produce sine and cosine signals having magnitudes which depend upon the instantaneous position of the rotor. The resolver 31 is driven by a square wave voltage having a frequency which is high with respect to the running speed of the motor multiplied by the number of motor pole pairs.

The output of the resolver is a high frequency carrier wave which is amplitude modulated in accordance with rotation of the rotor. Each wave from the resolver 31 is demodulated in a demodulator 37 or 39, as the case may be, to provide a sine or cosine wave respectively, as rotor rotation continues.

The stator windings 29 and 33 are driven from power bridges 41 and 43 respectively. The power bridges include means for supplying a feedback signal indicative of the instantaneous current flowing in each stator winding. Thus the lines 45 conduct feedback signals from the bridge 43 to a summer 47, whereas the feedback loop 49 provides a corresponding feedback signal to a summer 51 in response to stator winding currents detected in the power bridge 41.

The output of each summer is a sinusoidal wave having a frequency corresponding to the motor speed and an amplitude dependent upon motor loading.

The output of the summer 51 is applied to a pulse width modulator 53 and the output of the summer 47 is applied to a pulse width modulator 55. The square wave signal from the resolver excitation circuit 35 is applied through an integrating circuit 57 so as to produce a triangular wave which excites the primary of a transformer 59. The sinusoidal wave from the summer 47 is applied to a center tap on the secondary of the same transformer. The resulting secondary current from the transformer 59 is applied to a pair of comparators 61 and 63. The comparators provide a suitable threshold and effectively perform an adding and subtracting function. Inhibit logic transistors 65 and 67 cooperate to permit the passage of an output signal capable of turning on and off diagonally opposite power transistors in the power bridge 43.

When the triangular wave applied to the transformer 59 is positive-going, one of the comparators 61 and 63 provides an output during the time that the wave from the summer 47 is of the corresponding polarity and of sufficient amplitude to exceed the threshold. When the triangular wave applied to the transformer 59 has a negative polarity, the reverse condition obtains. Thus the pulse width modulator produces rectangular output signals on the lines 69 and 71. These signals have a constant amplitude but have pulse durations that are dependent upon the stator winding currents flowing in the appropriate winding of the motor. The output of the pulse width modulator 55 is applied to a mode switching circuit 73 whereas the output of the pulse width modulator 53 is applied to a corresponding mode switching circuit 75. During motor acceleration, the AND gates 77 and 79 in the switching circuit 73 are enabled as will be explained. This permits the signal from the pulse width modulator to be applied through the OR gates 81 and 83 so as to drive the power bridge 43. A similar situation obtains in the case of the switching circuit 75 which drives the power bridge 41.

The power bridges 41 and 43 are conventional devices, Bridge 43 is shown in simplified functional form. Signals from the OR gates 81 and 83 are applied alternately to the bridge. Thus when a high output signal is provided by the OR gate 81, a transistor 85 is driven into conduction. The same signal from the OR gate 81 is inverted in an inverting circuit 87 so as to cut off conduction in an associated transistor 89. At the same time, the OR gate 83 produces a low level output signal which is inverted in an inverting circuit 91 so as to drive the associated transistor 93 into conduction. The same low output signal from the OR gate 83 cuts off conduction in the transistor 95. Thus under these conditions, the transistors 93 and 85 are conducting so that an amplified current can pass through the stator winding 33 from left to right in the drawing. During the next half cycle, the transistors 89 and 95 are driven into conduction and the transistors 85 and 93 are cut off. During this time interval, amplified current passes through the stator winding 33 from right to left in the drawing.

The shunt diode circuits 94 and 96 permit the flow of quadrature components of current.

Although the voltages applied to the bridges 41 and 43 from the comparator circuits have a rectangular waveform, the resulting current flow through the motor windings is essentially sinusoidal because of the motor inductance. Essentially no ripple occurs in motor winding current.

A similar chain of events occurs in the power bridge 41. However, these events occur in time quadrature since the power bridges 41 and 43 are driven from the sine and cosine signals from the resolver 31 respectively.

A two-phase oscillator 97 provides a pair of output signals corresponding to the desired running speed of the motor. One of the output signals from the oscillator 97 is applied through an AND gate 99 to a terminal B on the mode switching circuit 75. The same signal is also inverted in an inverter 101 and applied to a $\overline{B}$ terminal on the same switching circuit.

The second output signal from the oscillator 97 is similarly applied through an AND gate 103 to the OR gate 81 in the mode switching circuit 73. The signal from the AND gate 103 is also applied through an inverter 105 to the OR gate 83.

The second signal from the oscillator 97 is also applied to the frequency and phase detector circuit 107.

The signal from the oscillator 97 is a sinusoidal wave and passes through a conventional pulse former 109. The pulse former converts the sinusoidal wave from the oscillator into a sharp pulse. In a typical circuit, the pulse former may include a squaring amplifier and a differentiating circuit which produces a negative-going pulse in response to the negative-going portions of the falling output voltage waves from the squaring amplifier.

A second sinusoidal wave from the demodulator 39 is also applied to the frequency and phase detector 107. This latter sinusoidal wave is applied to a second pulse former circuit 111. The second pulse former is identical to the pulse former 109 and produces a sharp pulse at the same relative point in the sinusoidal wave. The pulses from the pulse formers 109 and 111 are applied to a coincidence circuit 113. When the coincidence circuit detects synchronism between the voltages from the demodulator 39 and the oscillator 97, a resulting coincidence pulse is applied to a multivibrator 115. The multivibrator 115 normally produces an output $\overline{X}$. However, the multivibrator is switched in response to a pulse from the coincidence circuit so that it thereafter produces an output voltage X until reset manually. Thus while the motor is accelerating, the multivibrator 115 produces a first mode signal $\overline{X}$ which enables the AND gates 77 and 79 in the switching circuit 73 so as to permit signals from the pulse width modulator 55 to be applied to the power bridge 43. The same mode signal from the multivibrator is also applied to the switching circuit 75 so as to permit signals from the pulse width modulator 53 to be applied to the power bridge 41.

When the motor reaches operating speed, the coincidence circuit 113 detects synchronism between the signal from the oscillator 97 and the demodulator 39, and triggers the multi-vibrator so as to produce a second mode signal X. This disables the AND gates 77 and 79 in the mode switching circuit 73 and the corresponding gates in the mode switching circuit 75. At the same time, the second mode signal X from the multivibrator 115 enables the gates 99 and 103. The signal B from the gate 99 is applied to the switching circuit 75 together with the inverted signal from the inverter 101. Similarly, the signal from the gate 103 is applied to the OR gate 81 in the switching circuit 73 and through the inverting circuit 105 to the OR gate 83 in the same switching circuit.

Under these conditions, signals from the pulse width modulators are blocked from reaching the power bridges. However, signals from the oscillator 97 are able to pass through the OR gates 81 and 83 in the switching circuit 73 as well as the corresponding OR gates in the switching circuit 75. Therefore, energization of the motor occurs solely in response to voltages from the oscillator 97.

The motor is now under constant control of the voltages from the oscillator 97. Even momentary perturbations in rotor speed are constantly corrected. Variations in load or speed are instantaneously sensed by changes in the stator winding currents and the load angle or phase difference between the rotor pole centerline and the rotating electromagnetic field from the stator winding excitation varies automatically without requiring closed loop control as does a conventional synchronous motor.

The circuit of the present invention provides a highly reliable and efficient motor which requires the use of a minimum number of components.

Since the run up system is used only during acceleration and is completely out of the circuit during the running mode of operation, failure of a component in the run up system does not affect the normal running mode of the motor.

Since all of the alternating currents in the runup system occur at a frequency corresponding to the instantaneous rotor speed, problems normally arising from spurious coupling are minimized.

While the invention has been described in its preferred embodiment, it is to be understood that the words which have been used are words of description rather than limitation and that changes may be made within the purview of the appended claims without departing from the true scope and spirit of the invention in its broader aspects.

I claim

1. An improved brushless d.c. motor of the type employing a permanently magnetized rotor rotatably mounted in operative relationship with respect to a plurality of stator winding coils, said improvement comprising, resolver means for providing signals indicative of the sine and cosine of the instantaneous rotor displacement angle, power bridge means for sequentially energizing said stator winding coils so as to cause rotation of said rotor in response to output signals from said resolver means, a source of sinusoidal alternating current signals having a fixed frequency corresponding to the desired running speed of said motor, detection means coupled to receive signals from said source and from said resolver means, coincidence means in said detection means for providing a coincidence signal whenever the input signals to said detection means become synchronized, means in said detection means for providing a first mode signal until the occurrence of a coincidence signal and a second mode signal thereafter, and switching means for actuating said power bridge means from said resolver means in response to a first mode signal and only from said source in response to a second mode signal.

2. The apparatus of claim 1 wherein the stator winding coils include first and second coils arranged in space quadrature and wherein said power bridge means includes first and second power bridges for energizing said first and second coils respectively, said first power bridge being coupled through said switching means to respond to sine output signals from said resolver, said second power bridge being coupled through said switching means to respond to cosine output signals from said resolver.

3. The apparatus of claim 2 wherein each of said power bridges includes means for supplying a feedback signal indicative of the corresponding stator winding coil current being supplied by said power bridge, said apparatus further including first and second summer means for combining the feedback signal from said first power bridge with said sine signal and the feedback signal from said second power bridge with said cosine signal respectively, said power bridges being actuated in response to signals through said summer means.

4. The apparatus of claim 3 wherein the signals from said summers are coupled to the respective power bridges through individual pulse width modulators, said pulse width modulators being constructed to provide rectangular output pulses having a polarity and pulse duration determined by the polarity and amplitude of the signal from the corresponding summer circuit.

5. The apparatus of claim 4 wherein said resolver is excited by a resolver excitation circuit at a frequency that is high with respect to the product of the running speed and number of motor pole pairs and wherein said pulse width modulator includes means to convert a signal from said resolver excitation circuit into triangular waves and means to combine signals from the respective summer with said triangular wave, each of said pulse width modulators further including first and second comparator means to provide output signals whenever said combined signal exceeds a positive and negative threshold, respectively.

6. An improved brushless d.c. motor of the type employing a permanently magnetized rotor constructed to rotate in response to magnetic fields established sequentially by first and second stator windings arranged in space quadrature, said improvement including first and second switching means for selectively passing current in either direction through said first and second windings respectively, resolver means for producing sine and cosine waves having relative magnitudes uniquely defining the position of said rotor, first and second feedback means coupled to said first and second stator windings respectively for providing feedback signals indicative of the instantaneous magnitude of the current flowing in the associated stator winding, first summing means for adding the signal in said first feedback means to said cosine wave, second summing means for adding a signal in said second feedback means to said sine wave, means to couple the output of the first summing means through said first switching means to said first stator winding, means to couple the output of said second summing means through said second switching means to said second stator winding, a two-phase oscillator, means to couple one phase of said oscillator to said first switching means and the other phase of said oscillator to said second switching means, coincidence means coupled to receive signals from one of said oscillator phases and one of the waves from said resolving means, said coincidence means being constructed to provide an output signal when the signals applied to the coincidence means become synchronized, means coupled to the output of said coincidence means for providing a first mode signal until said coincidence means detects synchronism and for providing a second mode signal thereafter, means in said switching means for coupling the output from said summing means to said motor in response to a first mode signal, and means in said switching means for coupling the output of said oscillator to said motor in response to a second mode signal.

* * * * *